No. 826,092. PATENTED JULY 17, 1906.
G. T. DREW.
VEHICLE WHEEL.
APPLICATION FILED JULY 13, 1905.
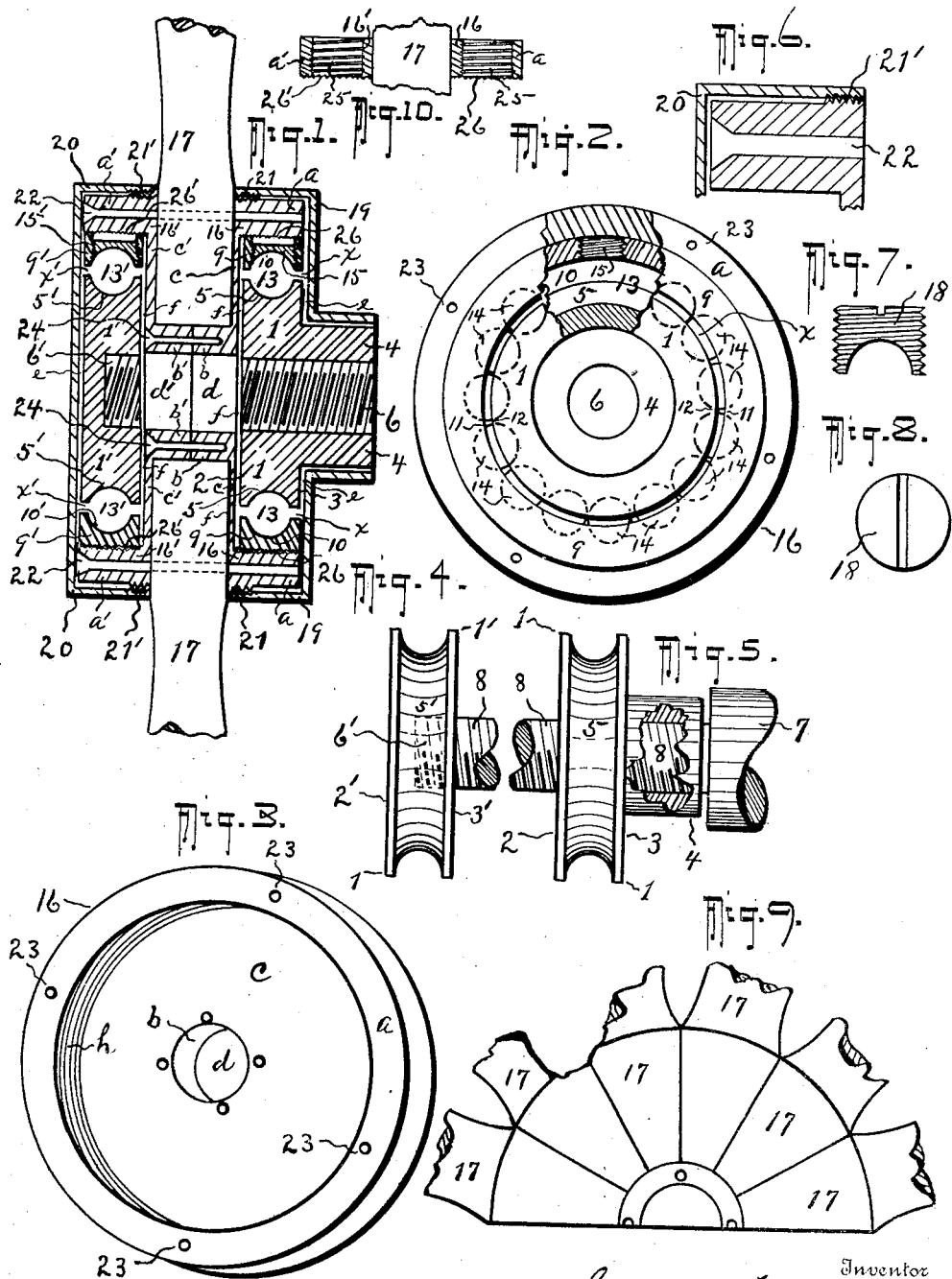
Witnesses: Arthur Sturges, Frederic Bacon
Inventor: George T. Drew
By Hiram A. Sturges
Attorney

UNITED STATES PATENT OFFICE.

GEORGE T. DREW, OF OMAHA, NEBRASKA.

VEHICLE-WHEEL.

No. 826,092.  Specification of Letters Patent.  Patented July 17, 1906.

Application filed July 13, 1905. Serial No. 269,456.

*To all whom it may concern:*

Be it known that I, GEORGE T. DREW, a citizen of the United States, residing at Omaha, in the county of Douglas and State of Nebraska, have invented certain new and useful Improvements in Vehicle-Wheels, of which the following is a specification.

My invention relates to improvements in vehicle-wheels, having reference more particularly to the central structure of the wheel, and has for its object the provision of a housing for the spokes, so that the latter may be more readily removed when injured or found defective; also, to provide a means so that the "gather" of wheels may be avoided; also, a means of construction so that the hub of the wheel will be less obtrusive and that the use of lubricants may be dispensed with, and to produce a wheel of strong construction adapted for heavy expressing or drayage, which shall have the least possible amount of friction, yet simple in its parts, so that persons not skilled may dismember the wheel and make their own repairs, and to be of inexpensive construction, comparatively; also, to provide a construction permitting the use of larger-diametered roller-balls for vehicle-wheels than has been possible in former constructions.

With these objects in view the invention presents a novel construction and arrangement of parts as disclosed herein and as illustrated by the drawings, wherein—

Figure 1 is a vertical sectional view of my complete invention. Figs. 2 and 3 are vertical side views of parts of the invention, the former partly in section. Figs. 4 and 5 are vertical end views of parts of Fig. 1, with broken lines and part torn-away portion to illustrate relation of parts. Figs. 6, 7, and 8 are details of parts shown in Figs. 1 and 2. Fig. 9 represents a series of spoke ends at their central junction. Fig. 10 is a detail in section to illustrate parts shown in Fig. 1.

I provide an inner circular bearing-rim 1, having vertical end walls 2 and 3, Fig. 5. Integrally upon said side 3 and with a less diameter than said side 3 is formed the laterally-extending cylinder 4. Said bearing-rim is provided with the curved annular groove 5 upon its periphery and with the threaded opening 6 extending its whole width.

The numeral 7 represents the axle of a vehicle having a threaded end 8 of less diameter than the axle, and, as is apparent, the bearing-rim may be screwed upon the threaded end 8 of the axle and may occupy a position contactingly adjacent to the axle 7.

The sleeve 9, Figs. 1 and 2, has the same width as bearing-rim 1 and is provided upon its inner surface with a groove 10, curved transversely with reference to its length, the degree of curvature corresponding to the curvature of groove 5 of bearing-rim 1, and when mounted sleeve 9 occupies the same vertical plane as that part of bearing-rim 1 contained between walls 2 and 3 thereof, its inner circular wall 11, Fig. 2, occupying a greater distance, radially considered, than the outer wall 12 of bearing-rim 1, thereby forming an annular opening $x$ between these walls, and as thus mounted a groove 13 is formed between said sleeve and bearing-rim, within which a series of balls 14, Fig. 2, is adapted to be seated. Sleeve 9 is provided with the threaded aperture 15, Figs. 1 and 2, of a diameter equal to that of the balls.

I provide the vertically-disposed compression rim or disk 16, Figs. 1, 2, and 3, having an outwardly-extending sleeve $a$ and an inwardly-extending sleeve $b$, these sleeves being integrally connected by the wall $c$, said wall $c$ being extended radially, the opening $d$ at the center within the inwardly-extending sleeve $b$ being provided with a smooth circular wall, and the opening $d$ being of a somewhat greater diameter than the threaded opening 6, the end 8 of axle 7 will have no frictional bearing upon the smooth circular wall of sleeve $b$.

It will be understood from the description that bearing-rim 1 when in operative position is mounted rigid with the axle, that the groove 13 is practically filled with balls, the wall $c$ of compression-rim 16 is closely adjacent to the vertical wall 2 of bearing-rim 1 and affords a bearing for one side of spokes 17, the outer wall of sleeve $a$ furnishing a seating for the end of the spokes.

The present invention is adapted to be employed in the construction of heavy-class vehicles, and in this construction devices are employed and mounted upon the outer side of the spokes very similar and in some respects identical to those already described. The outer circular bearing-rim 1' is provided, having vertical end walls 2' and 3', Fig. 4, provided with the curved annular groove 5' upon its periphery and the centrally-located recess 6', having circular side walls adapted to have thread-and-groove mounting upon the end of axle 8. I provide the sleeve 9', Fig. 1, having the same width as bearing-rim 1', with a groove 10', the degree of curvature corresponding to the curvature of groove 5' of bearing-rim 1', and when mounted sleeve 9' occupies the same vertical plane as bearing-rim 1' and is positioned adjacent thereto a sufficient radial distance to form the annular groove $x'$ therebetween, and when mounted the groove 13' is formed between said sleeve and bearing-rim, within which a series of balls, as the balls 14, (shown in Fig. 2,) may be seated, and I provide a threaded aperture 15' of sufficient size to permit the passage therethrough of the balls 14.

I provide the compression rim or disk 16', adapted to be mounted vertically and in contact with the outer sides and ends of spokes 17. Fig. 3 shows the construction of this compression-rim. The character $a'$, Fig. 1, represents the outwardly-extending sleeve of compression-rim 16', which is disposed as a hood over the periphery of sleeve 9', its inwardly-extending sleeve $b'$ furnishing a seating for the ends of spokes 17 and the integrally-formed vertical wall $c'$ furnishing the lateral support for the outer side of spokes 17, and since the opening $d'$ is of greater extent, radially considered, than axle 8 a rotation of the wheel does not cause any friction of $b'$ or $b$ upon said axle.

I provide plugs (indicated by the numeral 18, Fig. 7) adapted to be screwed within apertures 15 and 15', and to prevent dust from entering the apertures $x$ or $x'$ I employ casings 19 and 20, having a thread-and-groove mounting at 21 and 21', which effectually prevents sand or dust from entering the grooves where the balls are located. The parts are held together by means principally of screws 22, which enter openings 23, Fig. 3, and pass through compression-rims 16' and 16 near their peripheries and in part by screws 24, which hold together the inwardly-extending sleeves $b'$ and $b$. The bearing-rims 1 and 1' are held in operative position by the balls within the apertures 13 and 13'. These balls when placed in these apertures operate to prevent lateral or other dislodgment of these parts. The inner surfaces of the compression-rims are provided with threads $h$, Fig. 3, and since each sleeve has a thread-and-groove mounting within its respective compression-rim, as at 26 and 26', Figs. 1 and 10, these sleeves are securely held in operative position, and casings 19 and 20 therefore perform no function in holding the parts together for purposes of operation.

It will be noted that in operation there will be a rotation in common of all the parts shown except the axle and the bearing-rims. The entire weight of the vehicle rests upon the balls within grooves 13 and 13', and large-sized balls may be used, it only being necessary to increase the thickness of the bearing-rims and grooves 13 and 13'. It will also be observed that vertical openings $e$ and $f$, Fig. 1, are preserved between the bearing-rims and the adjacent casings and compression-rims, this opening being necessary, so that no friction will occur during rotation.

The parts are readily assembled or dismembered. Casing 20 is removable by manual rotation. Screws 22 and 24 are then accessible, and upon one part of the peripheries of compression-rims 1 and 1' are formed openings 25, as shown by Fig. 10, which extend radially to the seating of plugs 18. After the removal of the screws the sleeve and adjacent compression-rim are rotatable with reference to each other by reason of threads $h$, 26, and 26', Figs. 1, 3, and 10, the opening 25 being sufficiently wide to allow for any side or lateral movement during this rotation, so that opening 25 may be placed in alinement with plug 18, and said plug may then be withdrawn, and the balls will fall out of openings 25 from gravity upon rotation of the wheel. Sleeve 9' is then readily removable, and bearing-rim 1' may then be removed by manual rotation, after which compression-rim 16' may be removed, and a defective spoke may then be replaced or other repairs be made. By a reverse operation the parts may be assembled. If access to the parts upon the opposite side is desired, the wheel is first removed from the axle. There is no objection to the use of a longer plug than shown, having a length equal to the radial measurement of both the sleeve and compression-rim, in which case the outer face of the plug would be presented at the periphery of the compression-rim. This detail, however, is not important, so that a means is provided to pass the balls within the groove 13 or 13' and on occasion remove them.

By use of the invention the well-known and objectionable gather of the wheel is dispensed with, and since no lubricant is used there is no objectionable axle-grease upon the wheel, which often soils clothing.

A construction may be made whereby sleeves 9 and 9' may be dispensed with, since these sleeves may be formed as an integral part of the compression-rim. It is found by experience, however, that the balls wear the grooved surface of the sleeves and by interposing the sleeves, which are comparatively inexpensive, the more expensive compression-rims are preserved from the wearing effects of the balls.

It is manifest that the inner bearing-rim 1 could be constructed as an integral part of the axle, and the parts would be operative.

What I claim as my invention is—

1. The combination of a series of wheel-spokes, of an inner and outer bearing-rim; the inner and outer bearing-rims mounted stationarily adjacent and substantially parallel with reference to said wheel-spokes and with reference to each other; revoluble compression-rims interposed between said inner and outer bearing-rims, an outwardly-extending sleeve formed upon said compression-rims adapted to form a hood over said inner and outer bearing-rims, said wheel-spokes rigidly mounted between said revoluble compression-rims; there being a continuous groove formed between the periphery of each of said inner and outer bearing-rims and the inner surface of said outwardly-extending sleeves of said compression-rims, a series of balls seated within said continuous groove, an aperture being formed in the wall of each of said outwardly-extending sleeves, and means to close said aperture.

2. A vehicle-wheel as described, comprising bearing-rims having vertically-disposed circular walls mounted removably but non-revolubly upon the vehicle-axle; said bearing-rims mounted end to end upon opposite sides of the wheel-spokes; an outer sleeve mounted stationarily with reference to the wheel-spokes and extended laterally to include the vertical planes occupied by said bearing-rims; a ring member interposed between each of said bearing-rims and each of said outer sleeves; there being a continuous groove formed between said bearing-rims and said ring members; housing members mounted rigidly upon said wheel-spokes, each housing member having a vertical wall adjacent to each of said ring members and bearing-rims; balls seated within said continuous grooves, there being an opening provided for the passage of said balls within each of said grooves, and means to close said openings.

3. A vehicle-wheel as described, comprising bearing-rims having vertically-disposed circular walls rigidly mounted upon the vehicle-axle; the bearing-rims mounted to make an end-to-end presentation upon opposite sides of the spokes of said vehicle-wheel; an outer sleeve mounted stationarily with reference to said wheel-spokes, and extended laterally to include vertical planes occupied by said bearing-rims; a ring member interposed between each of said bearing-rims and each of said outer sleeves, there being a continuous groove formed between said bearing-rims and said ring members; housing members mounted rigidly upon said wheel-spokes, each housing member having a vertical wall adjacent to each of said ring members and bearing-rims; balls seated within said continuous groove, there being an opening provided for the passage of said balls within each of said grooves; means to close said openings, and casings mounted upon said sleeves, substantially as described.

In testimony whereof I have affixed my signature in presence of two witnesses.

GEO. T. DREW.

Witnesses:
WALTER W. DREW.
H. A. STURGIS.